US008965705B2

(12) United States Patent
Lagmanson et al.

(10) Patent No.: US 8,965,705 B2
(45) Date of Patent: *Feb. 24, 2015

(54) TECHNIQUES FOR SURFACE EXPLORATION AND MONITORING

(71) Applicant: Advanced Geosciences, Inc., Austin, TX (US)

(72) Inventors: Mats Lagmanson, Austin, TX (US); Liz Lagmanson, Austin, TX (US); Markus Lagmanson, Austin, TX (US); Bo Berglund, Jarfalla (SE)

(73) Assignee: Advanced Geosciences, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,756

(22) Filed: Feb. 18, 2013

(65) Prior Publication Data

US 2013/0320984 A1    Dec. 5, 2013

Related U.S. Application Data

(63) Continuation of application No. 12/719,676, filed on Mar. 8, 2010, now Pat. No. 8,380,439, which is a continuation of application No. 10/827,104, filed on Apr. 19, 2004, now Pat. No. 7,689,364.

(60) Provisional application No. 60/463,499, filed on Apr. 18, 2003.

(51) Int. Cl.
*G01V 1/00* (2006.01)
*G01V 3/00* (2006.01)
*G01V 3/02* (2006.01)

(52) U.S. Cl.
CPC . *G01V 3/02* (2013.01); *G01V 1/003* (2013.01)
USPC ............................................ 702/14; 324/347

(58) Field of Classification Search
USPC ........... 702/1–2, 5, 11, 14–17, 127, 182–183, 702/188–189; 324/323, 345, 347–350, 354, 324/357–358; 367/36–38, 40–42, 56, 58, 367/76–79, 117–118, 119–122; 340/2.1, 340/2.4, 3.1, 690, 870.01–870.03, 870.11, 340/870.16, 870.37–870.38
See application file for complete search history.

(56) References Cited

U.S. PATENT DOCUMENTS 2,174,343 A    9/1939    Jakosky
2,211,125 A    8/1940    Jakosky (Continued)

FOREIGN PATENT DOCUMENTS

WO    WO 00/26694    5/2000
WO    WO 00/29717    5/2000
WO    WO 01/20366    3/2001

OTHER PUBLICATIONS

Stummer et al., Optimization of DC Resistivity Data Acquisition: Real-Time Experimental Design and a New Multielectrode System, Dec. 2002, IEEE Transactions on Geoscience and Remote Sensing, vol. 40, No. 12, pp. 2727-2735.*

(Continued)

*Primary Examiner* — Toan Le
(74) *Attorney, Agent, or Firm* — Haynes and Boone, LLP

(57) ABSTRACT

Techniques for surface exploration and monitoring are presented. In representative embodiments, a system is provided that cars perform multiple types of measurements of a surface. For example a single system of survey probes and one or more survey controllers can be used to offer both seismic and electrical measurements. A survey controller can be configured to automatically poll survey probes to obtain identifiers of the probes aid determine a relative order the probes. Survey probes can be configured to: (a) collect signals associated with a surface; (b) digitize the signals to form digital data; and (c) store the digital data for later transmission to the survey controller. Relative positions of survey probes can be automatically determined using a transmitting beacon or other techniques. Survey probes can automatically disconnect from a power conduit while measuring a surface property and operate using an internal source of power when disconnected, to reduce noise. The survey controller can be remotely accessible through a computer network for remote control of the survey probes.

20 Claims, 8 Drawing Sheets

(56) References Cited

U.S. PATENT DOCUMENTS

| | | | |
|---|---|---|---|
| 2,241,623 A | 5/1941 | Silverman et al. | |
| 2,262,419 A | 11/1941 | Athy et al. | |
| 2,690,537 A | 9/1954 | Weiss et al. | |
| 3,068,401 A | 12/1962 | Janssen | |
| 3,810,000 A | 5/1974 | Aspinall et al. | |
| 3,881,166 A | 4/1975 | Fort et al. | |
| 3,938,073 A | 2/1976 | Fort et al. | |
| 3,946,357 A | 3/1976 | Weinstein et al. | |
| 4,001,768 A | 1/1977 | Fort et al. | |
| 4,320,472 A | 3/1982 | Fort | |
| 4,467,283 A | 8/1984 | Owne et al. | |
| 4,835,474 A | 5/1989 | Parra et al. | |
| 4,942,361 A | 7/1990 | Gast et al. | |
| 4,967,400 A | 10/1990 | Woods | |
| 5,144,253 A | 9/1992 | Blanchard | |
| 5,276,655 A | 1/1994 | Rialan | |
| 5,627,798 A | 5/1997 | Siems et al. | |
| 6,070,129 A | 5/2000 | Grouffal et al. | |
| 6,188,962 B1 | 2/2001 | Morgan et al. | |
| 6,219,620 B1 | 4/2001 | Park et al. | |
| 6,260,656 B1 | 7/2001 | Orban et al. | |
| 6,404,203 B1 | 6/2002 | Lagmanson | |
| 6,603,313 B1 | 8/2003 | Srnka | |
| 6,664,788 B2 | 12/2003 | Hornbostel et al. | |
| 6,674,286 B2 | 1/2004 | Lagmanson | |
| 6,731,114 B1 | 5/2004 | Lagabrielle et al. | |
| 6,847,896 B1 | 1/2005 | Orban et al. | |
| 6,975,942 B2 | 12/2005 | Young et al. | |
| 7,193,932 B2 | 3/2007 | Chamberlain | |
| 7,269,095 B2 | 9/2007 | Chamberlain et al. | |
| 7,299,133 B2 | 11/2007 | Duncan et al. | |
| 7,689,364 B2 * | 3/2010 | Lagmanson et al. | 702/14 |
| 8,380,439 B2 * | 2/2013 | Lagmanson et al. | 702/14 |
| 2003/0016587 A1 | 1/2003 | Wilson et al. | |
| 2004/0252585 A1 | 12/2004 | Smith et al. | |

OTHER PUBLICATIONS

Burger, H. Robert, "Exploration Geophysics of the Shallow Subsurface," pp. 241-361, Prentice Hall 1992.

Advanced Geosciences, Inc., Instruction Manual for The SuperSting R8 IP™ with Swift™; Release 01.01.26, Sep. 2001, pp. 1-54.

Advanced Geosciences, Inc., Swift™ for SuperSting R1—Dual Mode Automatic Electrode System, Datasheet, downloaded from http://web.archive.org/web/20030624065901/agiusa.com/datasheets/supersting-r8.pdf (apparently accessible at least as of Mar. 31, 2002) 2 pages.

Advanced Geosciences, Inc., Swift™ for SuperSting—Dual Mode Automatic Electrode System, Datasheet, downloaded from http://web.archive.org/web/20051228093350/agiusa.com/datasheets/swift_ss.pdf (apparently accessible at least as of Mar. 31, 2002) 2 pages.

Advanced Geosciences, Inc., SuperSting—8 channel Memory Earth Resistivity/IP Meter, Datasheet, downloaded from http://web.archive.org/web/20030624065901/agiusa.com/datasheets/supersting-r8.pdf (apparently accessible at least as of Mar. 31, 2002) 2 pages.

Advanced Geosciences, Inc., Instruction Manual for The Sting R1™, Sting R1 IP™ and Swift™, Release No. 3.0.13, Mar. 2002, pp. 1-102.

Stummer et al., *Optimization of DC Resistivity Data Acqusition: Real-Time Experimental Design and a New Multielectrode System,* Dec. 2002, IEEE Transactions on GeoScience and Remote Sensing, vol. 40, No. 12, pp. 2727-2735.

* cited by examiner

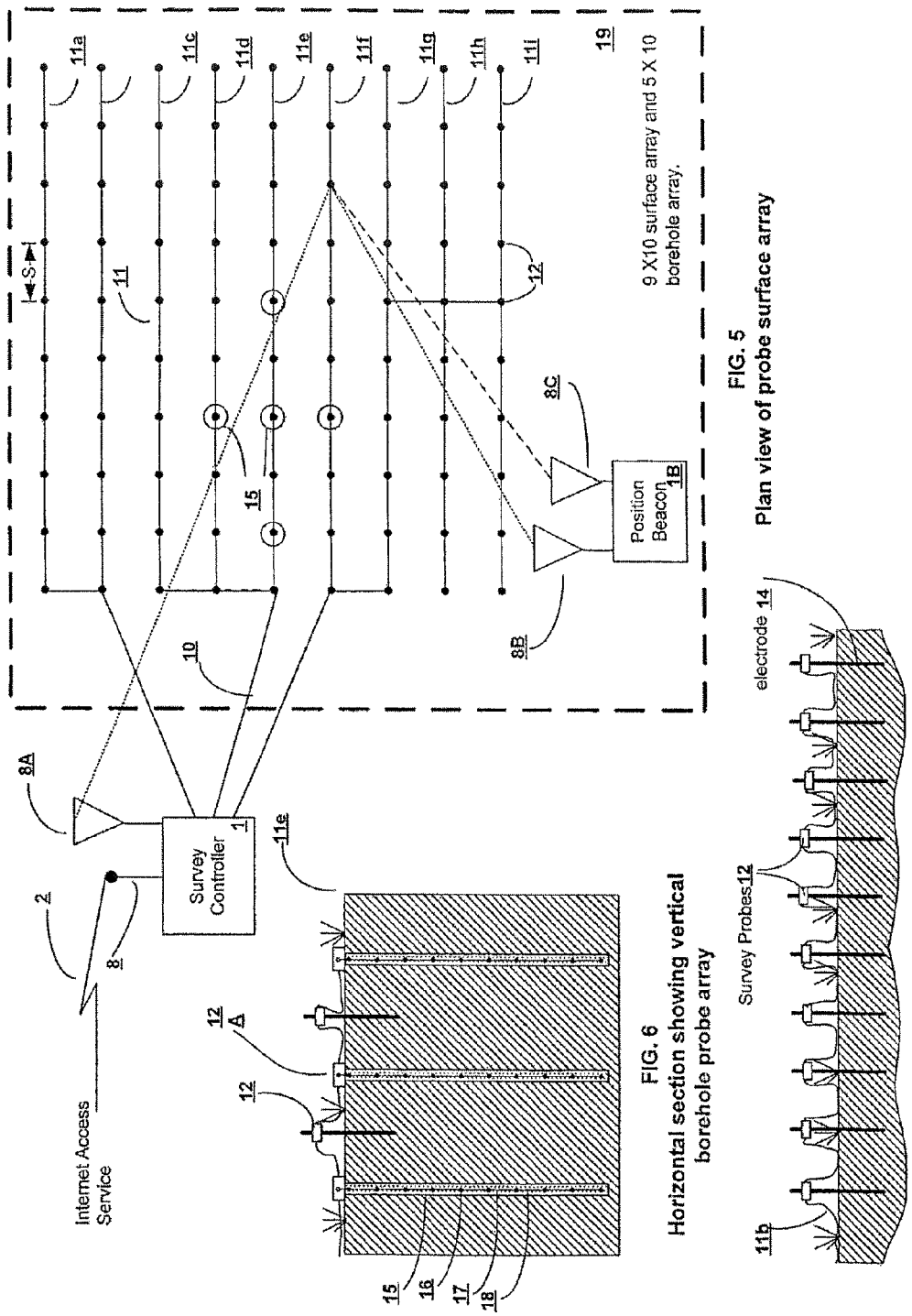

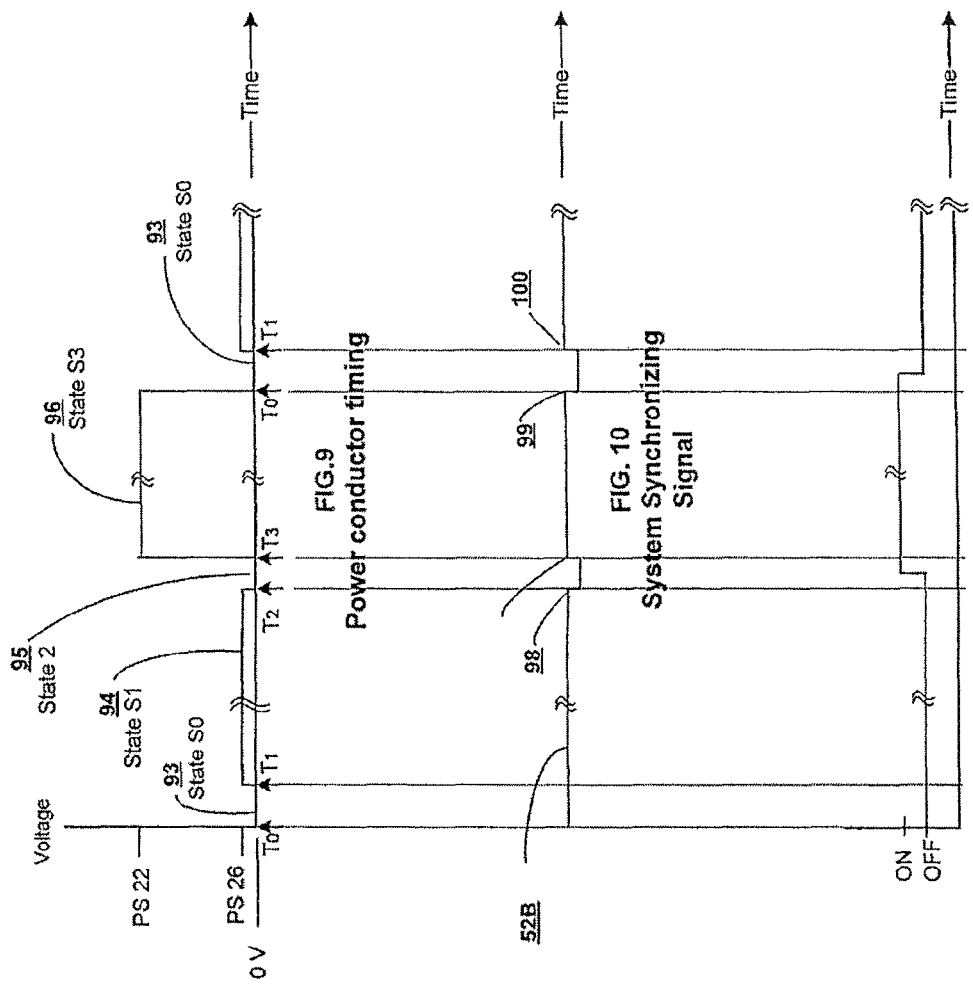

TECHNIQUES FOR SURFACE EXPLORATION AND MONITORING

CROSS REFERENCE TO RELATED APPLICATIONS

This application is a continuation of application Ser. No. 12/719,676, filed Mar. 8, 2010, now U.S. Pat. No. 8,380,439, which is in turn a continuation of application Ser. No. 10/827,104, filed Apr. 19, 2004, now U.S. Pat. No. 7,689,364, which in turn claims the benefit of provisional Application No. 60/463,499, filed Apr. 18, 2003, each of which is incorporated herein by reference.

BACKGROUND

This section provides the reader with a brief background of technology in the context of embodiments of this disclosure. Not only does this section provide context for several shortcomings in prior technology, but it also provides context about how the prior technology could, and will, benefit from various techniques described here. Simply because information appears in this section should not be taken as indicating its presence in the prior art. To the contrary, and as described immediately above, this section also provides context for certain significant improvements described and claimed in this disclosure.

Often specific survey objectives cannot be met by applying only one geophysical method. For example, in seismic and sonic reflection surveys, seismic refraction lines provide important information about velocities of near-surface materials which make it possible to apply needed corrections to reflection travel times. As electrical resistivity surveys depend on different physical properties than seismic or sonic surveys, the two taken together can provide important cross checks. If a system could perform multiple survey methods, better information about, for instance, the shallow subsurface could be obtained with a single multi-method survey.

Furthermore, there is developing interest in repeating surveys to observe changes that may occur in the subsurface, such as seasonal changes in groundwater level, effectiveness of subsurface pollutant remedial activities, and soil movement and water penetration under roadways, bridges, and dams. This usually requires that equipment be in place for long periods of time and necessitates frequent visits to the survey sites by geophysical technicians to monitor changing subsurface conditions.

The present state of the art does not provide an effective way to remotely manage field equipment and monitor survey data, much less monitor data in real-time. Field personnel must travel to the sites, perform the survey, collect the data in a temporary data storage device, and carry the data to a data center for processing and analysis. This may be done monthly, weekly, or more frequently depending upon how quickly the subsurface feature being monitored changes.

During a survey, one may discover that equipment performance has degraded or some components are not perforating at all. Presently, he or she must then contact a service technician by telephone to report the problem, resulting in lengthy and sometimes confusing attempts to diagnose the problem and repair the equipment. The result, is that the service technician must travel to the site to diagnose the problem, or the equipment must be sent to a service center for diagnosis and service.

Often, when equipment is returned to a service center, the equipment is found to be in satisfactory condition, and the problem remains at the site. This results in excessive "down-time" in the field and unplanned and excessive costs. If a means to remotely manage survey equipment and collect survey data were incorporated into a survey system, significant operational and cost advantages would accrue. For example, electrical resistivity strategies could be changed remotely and interactively from Dipole-Dipole to Wenner/Leed by the investigator. Measurement parameters such as injection current magnitude and period, survey frequency and method could be changed. Remote tests and diagnostics could be performed on all equipment to determine their level of operability and specific equipment requiring service.

A further disadvantage of present survey systems, in particular systems for the electrical resistivity, is the lengthy time required to perform a typical survey. Time limitations are due primarily to internal instrument noise caused by conductive coupling between cable conductors and connector pins (signal to noise ratio). The number of receivers active during a survey event is currently limited by the number of conductors in a cable. If a system were to eliminate the coupling noise and to remove the limitations on the number of receivers, shorter survey times could be achieved—from hours to minutes for a typical 100-survey probe system. This could result in survey crew labor savings and overall greater productivity.

Present electrical resistivity survey systems require multi-conductor cabling to simultaneously carry high voltage and low level analog potential signals. Multiple cable segments with integrated survey probes are connected together in the field in preparation for surveys. The cable segments must be connected with very careful attention to the order in which they are connected. Whether passive survey probes or intelligent survey probes, incorrect connections result in unintelligible and useless data. If an electrical resistivity survey system did not require cables to simultaneously carry high voltage and low voltage signals, data accuracy would be improved. Cables could be lighter and easier to handle in the field. Furthermore, if it were not required that cable sections must be connected in specific order, connection errors, survey errors, and field set-up time could be reduced.

Further, if data and control information could be exchanged between survey probes and the survey controllers) by modulated radio waves a further reduction in cable wiring could be achieved.

Additionally, with the proper radio design, radio receivers associated with each probe could triangulate relative position relative to one or more transmitters and provide precise position location of each survey probe relative to one or more transmitters whose positions are accurately known. Furthermore, knowing the precise locations of each survey probe, each survey probe can be assigned an address based upon it's serial number and it's spatial position. The particular cable segment to which it is connected is not relevant.

Shortcomings mentioned above are not intended to be exhaustive but rather are among many that demonstrate that room for significant improvement remains in the art and that the techniques of this disclosure would be useful and beneficial.

SUMMARY OF THE INVENTION

The invention is defined by the language of the claims. The description given in this and in subsequent sections simply represents different, example embodiments. Unless explicitly required by their language, the claims are nor limited to the listed example embodiments, and it will be apparent to those having ordinary skill in the art that various changes can be made to the example embodiments while not departing from the spirit or scope of the claims. All such modifications are encompassed by this disclosure.

Embodiments of the present invention are directed to a distributed, programmable multi-method shallow subsurface exploration system capable of performing synchronized analog to digital conversion of AC and DC electrical signals detected at 2 to 1000 or more points in a probe survey array. The signal conditioning and A/D conversion can be performed locally at an intelligent survey probe which contains electrical components such as a microprocessor, signal conditioning circuitry, short term energy storage, switching devices, and connections to one or more sensors and transducers associated with different exploration survey.

Embodiments of the invention provide a wireless link or, optionally, a conductor cable bus link for two-way communication between one or more survey controllers and survey probes. Each means (wireless or conductor cable bus) may be most suitable for a particular embodiment and may depend on the type of survey to be performed. Each means requires the spatial location of stimulus and measurement probes.

In cable bus embodiments, a time-multiplexed conductor cable system can be used for two-way communication between a survey controller and each of multiple survey probes, rather than by wireless means. The conductor cable system can provide for delivery of power from the survey controller to the survey probes.

In one embodiment, each survey probe is assigned a 4-byte serial number or other identifier. In one embodiment, such an identifier can be assigned at the time of manufacture. In cable bus embodiments, the serial number or other identifier can be obtained as the survey probe is connected to the cable in the field prior to survey events, or at any time after connection to the cable bus. This eliminates the requirement to connect survey probes in a specific order. Accordingly, a survey probe can be accessed by a command message from the survey controller using either the survey probe's serial number or a field-assigned access number or other identifier. A serialized access number is one convenient way to access survey probes from the survey controller, although it will be recognized that other techniques could be used.

Assignment of access numbers can follow a startup protocol. When a survey probe is first connected to a survey controller cable, it can receive power, initialize and send a data message to the communication data bus announcing its serial number or identifier. The survey controller can respond by sending a message to the survey probe serial number or identifier found in the incoming message, assigning an access number to the survey probe. The survey probe can accept the access number, acknowledge execution of the command, and enter an idle or standby state. This process can continue for each survey probe. In one embodiment, this process can continue until the operator signifies to the survey controller that the last survey probe has signed in or until the signing-in of the last probe is detected automatically.

In another startup protocol, one or more survey probes are connected on a survey controller cable and the cable is terminated on a survey controller. The survey controller applies power to the cable causing each survey probe to execute a start up protocol, disconnect its down-stream neighbor from the signal bus, and enter an idle state. Downstream refers to survey probes toward the end of the cable and away from the survey controller. The survey controller transmits a special broadcast command to the cable to command any survey probe in idle state to report its serial number code. Only the first survey probe receives the command (ail the other downstream neighbors are disconnected) and responds with its survey prove serial number code. The survey controller receives the serial number code from the first survey probe and can respond with a command to the first survey probe to accept a different identifier as its access code. The first survey probe can change its access code to this different identifier, exit from the idle state and proceed to state S1. The first survey probe can reply to the survey controller confirming its access code and connects the second downstream survey probe to the cable. At this point in the process, the only survey probe in the idle state is the second survey probe. The cycle continues until no further responses are received from the special broadcast command, which result in the reporting of serial number codes. In this manner, each probe is automatically identified, associated with a unique identifier, and its order relative to the other probes (first probe, second probe, third probe, etc.) is determined. As will be recognized by those having ordinary skill in the art, this process can save a significant amount of time because the survey controller can now automatically determine probe order and identifiers during, for instance, a startup protocol.

In one embodiment, the investigator, prior to starting the survey, manually records the positions of all connected survey probes according to their respective identifier. The survey controller knows the access identifier and the order of each survey probe in the cable network and is prepared to execute surveys.

In a different embodiment, the position of each survey probes is determined wirelessly by measuring its distance from two or more reference point locations generally positioned on the survey site.

In a wireless embodiment, one can determine the spatial location of each survey probe using radio, sonic or optical position transceivers. Each survey probe measures its distance from one or more position-transmitter sources, one of which may be the survey controller. These measurements are transmitted to the survey controller. From these measurements, the survey probe calculates its distance from each position transmitter source and reports this information and its identifier to the survey controller. The survey controller can use this information to control the survey. The survey controller can assign a unique access number or other identifier to each survey probe.

Another embodiment of a wireless technique for determining spatial position of a survey probe uses an RFID transponder, such as Texas Instruments RI-TRP-B9WK, associated with each survey probe. The transponder is responsive to interrogation by a an RFID reader such as the portable TI Series 2000 reader system. A differential GPS receiver is also used, and this receiver can be integrated with the RFID reader. The RFID reader can be placed near a probe for interrogation. The reader interrogates the RFID transponder and receives the transmitted data. The data, unique to each transponder, is received and combined with the reported Differential GPS longitude, altitude, and latitude measured at the probe. This data can be stored in the RFID memory until communicated to the survey controller.

In a wireless embodiment for determining spatial position using the known position transmitter positions, the survey controller can also calculate relative positions of survey probes and convert them to standard longitude, latitude, and elevation coordinates, or another convenient coordinate system, for each survey probe. Generally, two properly positioned position transmitters are required for survey probe location in a two dimensional space, and three are required for locating survey probes within a three dimensional space.

In wireless embodiments, each survey probe thereafter may be accessed by either its serial number or access number in subsequent message packets or by way of other wireless transmission techniques known in the art.

In different embodiments, probes can be connected to survey controllers by cable for transmission of operating power, stimulus (power to energize stimulus transducers, such as current injection) as required by the survey controller's survey program, and for signal measurement reference. Two conductors can carry power to the survey probes for charging one or more temporary energy storage devices, the electronics, and relays during a survey dwell time. These two conductors can also carry high energy to power stimulus injectors during a survey event and complete the circuit to a high energy power supply. It is to be noted that passive survey events can be performed by measuring natural induced potentials without the injection of a stimulus into die earth. The third, conductor can provide a reference for potential measurements during the survey event, and, in conjunction with one of the power conductors, a data communication bus (e.g., a bus between survey events).

According to different embodiments, electrical resistivity measurements can be made by applying a voltage to cause a measured current flow between two or more stimulus points on a surface such as the earth's surface e.g., stimulus points). Differences of the induced voltage potentials between one or more measurement points can be determined. The potential measurement data and current flow data and probe positions can be processed by the application of known mathematical processes, typically reduced to computer programs. Using the mathematical processes, the resistivity of a subsurface can be deduced or inferred.

In reference to 3-conductor embodiments described above, the third conductor can provide for a common potential to which all or a number of survey probes measure induced potentials. The third conductor can be electrically-connected to some point in the earth or on the current injection source. Since survey probe measurements can be made relative to this common potential, the potential difference between participating survey probes can then be calculated, and the resistivity determined as just previously described.

The third conductor can also provide for measurement of the potential difference only between two adjacent survey probe points. Survey probes can measure potentials relative to that of a specified neighboring survey probe. Segments of the third conductor can be switchable to provide the connections between the survey probes, operating to provide a reference voltage during the survey event. This reference can also be switchable to provide a common reference voltage to all survey probes.

Different embodiments also provide the ability to measure the potential change of a measurement point due to an injection stimulus. The measurement point can be measured prior to a current injection. This same point can be again measured alter the injection stimulus. The difference is taken. This difference is the potential change due to the injection stimulus. The survey controller can signal each survey probe a predetermined time prior to stimulus injection. At this time after a programmed delay, each, survey probe can sample and hold the data collected. In different embodiments, each probe can delay for a pre-programmed delay time after a signal has been received from the survey controller, before the probe begins to sample. In one embodiment, the default delay time is zero. However, each probe may be setup by the survey controller with a different delay-to-sample.

In reference to 3-conductor embodiments described above, the third conductor can carry data (e.g., via data packets or other known means) to and from survey probes and a survey controller during, e.g., the survey dwell time that is between survey events. For example, data packets may contain commands from the survey controller which are decoded by the accessed survey probe to set-up or prepare for a survey event, or it may be a command to the accessed survey probe to transmit survey data from a previous survey event.

During a survey event, the third conductor can be switched to a reference voltage, such as earth ground, by the survey controller. Reference ground can be used by each survey probe as a reference signal for sensor signal measurements. Simultaneously or at a different time, the survey probe can disconnect itself from the two power conductors and obtain operating power from its energy storage device. In one embodiment, the energy storage device can be a 0.1 Farad capacitor manufactured by AVX Corp., part number BZ015A104ZHB, or equivalent. The value of the capacitor may differ for different embodiments. This capacitor can be charged during the dwell time and contains sufficient energy to operate the survey probe during the survey time. One advantage of using a capacitor is that it does not need replacement as do batteries, it eliminates the maintenance due to battery replacement, it eliminates the need for battery charging circuitry, and it eliminates environmental issues associated with disposing of large numbers of batteries. Use of an internal energy source such as a capacitor beneficially allows for the isolation of the survey probe from the survey controller during the survey event and significantly reduces noise. Another embodiment isolates all survey probes completely, connecting only to an adjacent survey probe and recording the difference potential measured between die two survey probes.

In conventional systems, dc power is generated and delivered to all probes directly from a central power source and is usually regulated at individual probes. This dc power line, even though filtered at each probe, typically picks up radiated noise from the environment due to long cable runs. Each probe therefore contributes filtered noise to the conducted digital noise to the dc power distribution conductor's to all other probes. Any ripple or transient noise induced by the central power supply contributes noise. Although conventional practice involves filtering the dc power line with high pass filter capacitive networks, the filtered noise is applied to the ground circuit of each probe. This noise finds its way into the measurements of ail other probes.

Another source of noise can be high voltage injection current conductor, which is in interest of economy, usually carried in the same cable with (a) the dc power conductor, (b) the dc power ground, (c) the high voltage return conductor, (d) the signal conductors and (e) the signal return conductor common to all signal conductors. Also there can be large current and high voltage transients during any injection period, which can couple noise to the micro-volt level signals on signal conductors, significantly decreasing the signal to noise ratio of the measurement and requiring complex filtering processes and circuitry to minimize the deleterious effects. This occurs during the period that the very sensitive measurements are being made.

Embodiments of this disclosure virtually eliminate external noise problems by having all (or a subset of) probes isolate themselves from these external noise sources during a measurement period. Furthermore, digital data representing the measurements can be transmitted during a dwell time and are virtually insensitive to noise on the cable.

In embodiments of the disclosure, signals can be conditioned and digitized directly from conductive stakes or other transducers such as motion, sound, magnetic, or gravimetric transducers properly coupled to e.g., the earth surface or boreholes through the surface.

Prior to a survey event, each survey probe can receive a setup command data packet from a survey controller specifying its function during the survey event as mentioned above. Any survey probe can be adapted to function by command as a signal receiver and processor, or stimulus injector. For example, in the case of the electrical resistivity method configuration, a survey probe can be adapted to function as an electrical current injector.

In one embodiment, survey probes receive a first synchronizing signal from a survey controller and each probe proceeds to configure itself according to the setup command it received from the survey controller by operating switches and initialising a correct program to perform the tasks and selecting the signal source for the A/D converter in preparation for the survey event.

In this embodiment, survey probes receive a second synchronizing signal and those survey probes assigned the task of stimulus or scheduled injection proceed to inject the stimulus into the surface, which in one embodiment may be according to a pre-programmed time delay and period. All survey probes assigned the task of receiver can delay for a programmed time period and commence to digitize and filter the signals received from the connected sensors, according to prescribed processing algorithms. Survey probes can accumulate processed signal data until requested by the survey controller. In one embodiment, simultaneous to receiving the second synchronizing signal, survey probes assigned the function of stimulator injector can direct high power voltage through their switches to their corresponding connected stimulators. The stimulator might be a magnetic hammer for sound or seismic method, or a metal stake for current injection for electrical resistivity method. Other stimulators known in the art can also be used.

At the conclusion of a survey event, each survey probe can enter an idle mode and reconnect power and one or more communication conductors to the energy storage device and communications device, respectively, in preparation for receiving a message from a survey controller to report its results of the survey. A survey controller program then can optionally command each survey probe to report the data it captured during the survey event. If no such command is received by a survey probe, it can store the results for future delivery at the request of the survey controller. If another survey event is to occur, the survey controller can send new setup information to each survey probe in preparation for the next survey event, and the cycle can be repeated.

In one embodiment, access to the survey controller is provided by a local or remote Internet browser or by way of another computer network. A web server can be embedded within a survey controller, and the server can include software to interact with survey probes. A local or remote browser can effect secure download of applications programs and diagnostic software to specific survey probes. The survey controller can accept uploads from the remote browser to initiate built-in test software, to report key system operational data, to collect survey data, update information and survey instructions, and/or other functions with which the survey controller software has access to.

In one embodiment, communication server function is provided in one or more survey controllers in the survey environment, and the one or more controllers are connected to a remote network. Connection to the remote network may be by satellite or terrestrial means. In one embodiment, primary communication can be accomplished between survey controllers and any communicating device accessible via the Internet by using techniques known in the art of communications such as techniques the Hypertext transfer protocol (HTTP) and hypertext markup language (HTML), and/or (XML) Extended Markup Language. Each survey controller can be adapted to facilitate real-time access between a survey controller and a remote device upon access of a particular page, script, or function.

In one embodiment, executable content is embedded in one or more HTML pages so that when a page is loaded onto an HTML browser after being accessed, the executable content starts running automatically. The executable content can act to perform specified data transfer operations between the browser and one or more survey controllers. Additionally, survey controllers' operating systems, upon detection of an urgent local event, can request or initiate a session with an appropriate, predetermined remote terminal device or server for service.

In one respect, the invention involves a system for measuring a property of a surface, the system including a plurality of survey probes and a survey controller. Each of the of the survey probes has a unique identifier, and the survey controller is configured to automatically poll the survey probes to obtain each identifier and determine a relative order the probes. In one embodiment, polling can occur once during a startup protocol, although it will be understood that it could occur at different times/frequencies throughout any given process. In one embodiment, the polling may take place as follows: each survey probe can be configured to (a) disconnect a downstream neighbor survey probe and enter an idle state; (b) report its unique Identifier to the survey controller if in the idle state and in response to a polling command from the survey controller; and (c) change to a state other than the idle state after reporting its unique identifier. In other embodiments, different steps may be taken that are suitable to convey unique identifiers to the survey controller and to convey relative ordering of the probes. This, of course, greatly improves the state of the art in which determination of probe ordering is typically bandied manually in a time consuming manner. The survey controller can be configured to assign and transmit a different, unique identifier to each survey probe. The survey controller and survey probes can be configured to communicate wirelessly. The survey controller and survey probes being can be connected by a first number of conductors, the survey probes can be configured to perform a second number of simultaneous measurements of the surface, and the second number need not be limited by the first number. Accordingly, the system can be set up to do a number of simultaneous measurements independent of the number of conductors connecting probes to the survey controller. For instance, although probes may be connected, in one embodiment, to the survey controller using three conductors, far more than three simultaneous measurements can be performed. The survey controller can be remotely accessible through a computer network, for remote control of the survey controller and the survey probes. In one embodiment, this computer network is the Internet, although other networks can be utilized as well. The survey probes can be connected to the survey controller through three conductors, two conductors supplying power and a third conductor acting as a communications bus.

In another respect, the invention involves a system for measuring a property of a surface, the system including a survey controller and a plurality of survey probes that are configured to: (a) collect signals associated with the surface; (b) digitize the signals to from digital data; and (c) store the digital data for later transmission to the survey controller. The survey probes can be configured for performing both electrical and seismic measurements, and the signals can include seismic or electrical signals. The signals associated with the surface can include signals that are generated in response to the surface being stimulated. For example, the signals can be in response to electrical and/or seismic stimulation. In other embodiments, the signals can result from a passive state of the surface. The survey controller and survey probes can be configured to communicate wirelessly. The survey controller can send data to individually program survey probes to generate a stimulus simultaneously or according to another programmed timing scheme. The stimulus cart include injection of current. The survey controller can send data to individually program survey probes to form digital data and store the digital data according to a programmed timing scheme. The survey controller and survey probes being can be connected by a first number of conductors, the survey probes can be configured to perform a second number of simultaneous measurements of the surface, and the second number need not be limited by the first number. Such an embodiment and its advantages are described immediately above. The survey controller can be remotely accessible through a computer network (e.g., the Internet) for remote control of the survey controller and the survey probes. The survey probes can be connected to the survey controller through three conductors, two conductors supplying power and a third conductor acting as a communications bus.

In another respect, the invention involves a system for measuring a property of a surface, the system including a survey controller and a plurality of survey probes that are configured to: (a) collect signals associated with the surface; and (b) sample and, hold the signals for later transmission to the survey controller.

In another respect, the invention involves a system for measuring a property of a surface, the system comprising a survey controller and a plurality of individually-addressable survey probes, where the survey controller is configured to: (a) transmit a first signal to individually program survey probes to conduct one or more steps for measuring the property of the surface and (b) transmit a second signal to cause survey probes to conduct the one or more steps according to a timing sequence. Accordingly, the survey controller can send programming instructions to individual probes and then send instructions to carry out the program. Such instructions can be sent remotely over a computer network such as the Internet. Such embodiments provide for a level of flexibility and convenience not known in the art. The survey controller and survey probes can be configured to communicate wirelessly. The survey controller can further be configured to transmit a third signal to diagnose survey probes. This, among other things eliminates or reduces the need for on-site technicians to perform diagnostics on probes. The survey controller and survey probes can be connected by a first number of conductors, the survey probes can be configured to perform a second number of simultaneous measurements of the ground, and the second number need not be limited by the first number. As mentioned above, the survey controller can be remotely accessible through a computer network for remote control of the survey controller and the survey probes. The survey probes can be connected to the survey controller through three conductors, two conductors supplying power and a third conductor acting as a communications bus.

In another respect, the invention involves a system for measuring a property of a surface, the system including a survey controller and a plurality of individually-addressable survey probes, where the survey controller is configured to transmit a diagnostic signal to individual survey probes to diagnose the individual survey probes.

In another respect, the invention involves a system for measuring a property of a surface, the system including a survey controller and a plurality of survey probes whose position relative to one another is automatically determined. This advantageously allows for much more efficient measurement techniques because the system can itself determine physical relative and/or absolute locations of probes. In one embodiment, a transmitting beacon is provided, and the position is determined using a signal from the transmitting beacon. In another embodiment, a radio frequency identification (RFID) system is coupled to the probes and a Global Positioning System (GPS) is used. The position is determined by combining identification information from the RFID system with positional location from the GPS. In another embodiment, the RFID system can alone be used to identify individual probes and report that information, including information about the relative ordering of the probes, to the survey controller. The survey probes can be in motion. In such an embodiment, even if the probes are being, e.g., pulled behind a boat, their relative positions can be continuously determined. This offers great advantages over the current state of the art.

In another respect, the invention involves a system for measuring a property of a surface, the system including a plurality of survey probes and a survey controller configured to supply power to the survey probes using a power conduit. The survey probes automatically electrically disconnect from the power conduit while measuring the property and operate using an internal source of power when disconnected to reduce mist. This reduction of noise offers great advantages over the current state of the art such as improved accuracy of measurements.

In another respect, the invention involves a system for measuring a property of a surface, the system including a plurality of survey probes and a survey controller configured to program the same survey probes for seismic or electrical measurements of the surface. Accordingly, one system of survey probes and controller(s) can be used not only to do electrical resistivity measurements, but can also be used to perform seismic measurements. Currently, two separate systems would be necessary. Those having ordinary skill in the art with the benefit of this disclosure will recognize that even additional different types of measurements cat be performed with a single system. Allowing such flexibility is, among other things described here, the ability to individually program survey probes to follow instructions dictated, by the survey controller (e.g., to follow instructions to produce a certain type of stimulus and/or to receive data according to specified timing schemes). Each other embodiment of tins disclosure can also exhibit this significant advantage, allowing for different types of properties of a surface to be measured, with different measurement techniques (e.g., but not limited to, electrical and/or seismic) using a single measurement system that is configured to be programmed for different types of measurements according to different timing schemes and the like.

In another respect, the invention involves system for measuring a property of a surface, the system including a plurality of survey probes and a survey controller that is remotely accessible through a computer network for remote control of the survey probes, the remote control including: (a) remote initiation of a measurement of the property of the surface and (b) remote collection of data from a measurement of the property of the surface. In one embodiment, the network can be the Internet. The remote control can further include remote processing of data from a measurement of the property of the surface. The remote control can further include remote diagnostic testing of survey probes. The computer network can include a wireless network.

In another resect, the invention involves a system for measuring a property of a surface, the system including a plurality of survey probes and a survey controller configured to program the plurality of survey probes to simultaneously apply a stimulus to the surface in an arbitrary pattern. In conventional systems running electrical measurements, point source injection of current is the norm. Using techniques of this disclosure, however, one is not limited to such point injection. Rather, one can simultaneously inject current using several different probes in an arbitrary pattern to create, e.g., a line-source injection, a traveling pattern, etc. In one embodiment, the pattern includes a line pattern, and in another embodiment, the pattern includes a moving wave pattern. Many other patterns and schemes can be used as will be recognized by those of ordinary skill in the art to perform several measurements that, until now, have been effectively impossible.

In another respect, the invention involves a method for measuring a property of a surface, the method including: collecting signals associated with the surface using a plurality of survey probes; digitizing the signals using the plurality of survey probes to form digital data; and storing the digital data using the plurality of survey probes for later transmission to a survey controller. The method can also include: polling the survey probes using the survey controller to automatically: (a) obtain an identifier of each survey probe; and (b) determine a relative order of the survey probes. The survey controller and survey probes can be connected by a first number of conductors, and the method can also include performing a second number of simultaneous measurements with the survey probes, the second number not being limited by the first number. The method can also include: controlling data acquisition, data processing, or data collection associated with the survey controller remotely over a computer network. The survey probes can be connected to the survey controller by one or more conductors that supply power, and the method can also include automatically disconnecting the survey probes from the one or more conductors while measuring the property and operating using an internal source of power when disconnected to reduce noise. The method can also include automatically determining the relative position of the survey probes. The relative position can be determined using (a) a transmitting beacon or (b) a radio frequency identification (RFID) system and a Global Positioning System (GPS). The method can also include performing a seismic and electrical measurement of the surface using the same survey probes.

In the embodiments described here, the term "surface" is broad, and encompasses any surface or sub-surface. A surface can include surfaces of water, ground, underwater surfaces, man-made surfaces, borehole surfaces, borehole subsurfaces, etc. As used herein, "automatically" distinguishes an act done manually by, for instance, a technician. In preferred embodiments, "automatic" tasks are done via computer instructions that dictate certain tasks be done by one or more computers or computer-operated hardware. As used in the claims, the indefinite articles "a" and "an" mean one or more unless explicitly noted otherwise. For instance, although claims may state "a" survey controller, it will be understood feat the claim encompasses and contemplates situations in which more than one controller is used. The term "comprising" in the claims is an open-ended terra "Couple" means a direct or indirect connection.

Other advantages and features of embodiments of this disclosure will be apparent with reference to the following drawings and the additional description that follows.

BRIEF DESCRIPTION OF THE DRAWINGS

The drawings accompanying and forming part of this specification are included to depict certain aspects of the invention. A clearer conception of die invention, and of the components and operation of systems provided with the invention, will become more readily apparent by referring to the exemplary, and therefore nonlimiting, embodiments illustrated in the drawings, wherein like reference numerals (if they occur in more than one view) designate the same or similar elements. The invention may be better understood by reference to one or more of these drawings in combination with the description presented here. It should be noted that the features illustrated in the drawings are not necessarily drawn to scale.

FIG. 5 is a plan drawing depicting a cable interconnected array of survey probes arrayed and connected to a survey controller according to embodiments of the present disclosure.

FIG. 6 is a horizontal section through the earth showing vertically arranged survey probes in a borehole interconnected by cable segments according to embodiments of the present disclosure.

FIG. 7 is a horizontal section view of a linear array of survey probe mounted on conductive stakes inter-connected by cable segments according to embodiments of the present disclosure.

FIG. 9 is a drawing depicting multiplexing of power to survey probes according to embodiments of the present disclosure.

FIG. 10 depicts a system synchronizing signal derived at each survey probe according to embodiments of the present disclosure.

FIG. 11 deplete operating timing of system relays according to embodiments of the present disclosure.

DETAILED DESCRIPTION OF EXAMPLE EMBODIMENTS

Figure 1:
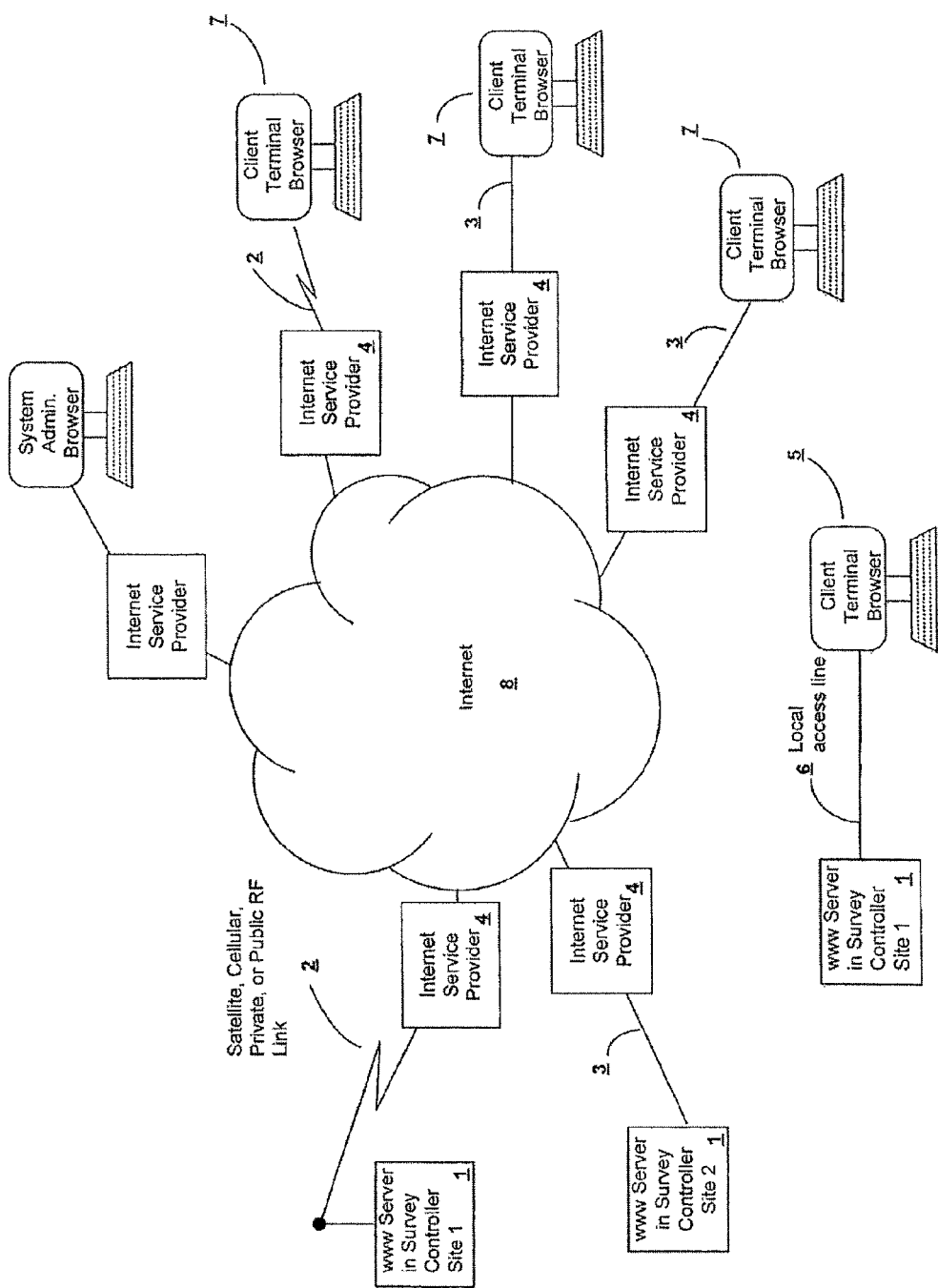
FIG. 1 is a drawing depicting a wide area network of multiple survey controllers connected through the Internet or locally according to embodiments of this disclosure.

Referring now to the drawings it will be understood that the illustrations and accompanying text are provided to describe example embodiments and are not intended to limit the invention herein. It is the claims that define the invention.

Certain aspects of this disclosure focus on the electrical resistivity survey method managed by a local or remote browser. It will be clear to those having ordinary skill in the art that the following description applies equally well to other survey method applications known in the art. Neither this disclosure nor the claims (unless explicitly stated otherwise) are limited to a particular type of survey method such as electrical resistivity.

The World Wide Web is a collection of servers of the Internet that use the hypertext transfer protocol (HTTP). HTTP is a known application protocol that provides users with access to files, which can be in different formats, such as text, graphics, images, sound and video using a standard page description language, HTML. HTML provides basis document formatting and allows the developer to specify links to other servers and files therein. Use of an HTML compliant client browser involves specification of a link having a URL. Upon such specification, the client makes a request to the server identified in the link and receives a web page, basically in document format, according to HTML, in return. HTML provides exceptional freedom in creating graphics/text/graphic images and associated audio between servers and client browsers. HTTP and HTML allow complex services to be accessed by clients having a minimum amount of hardware sophistication.

Figure 12:
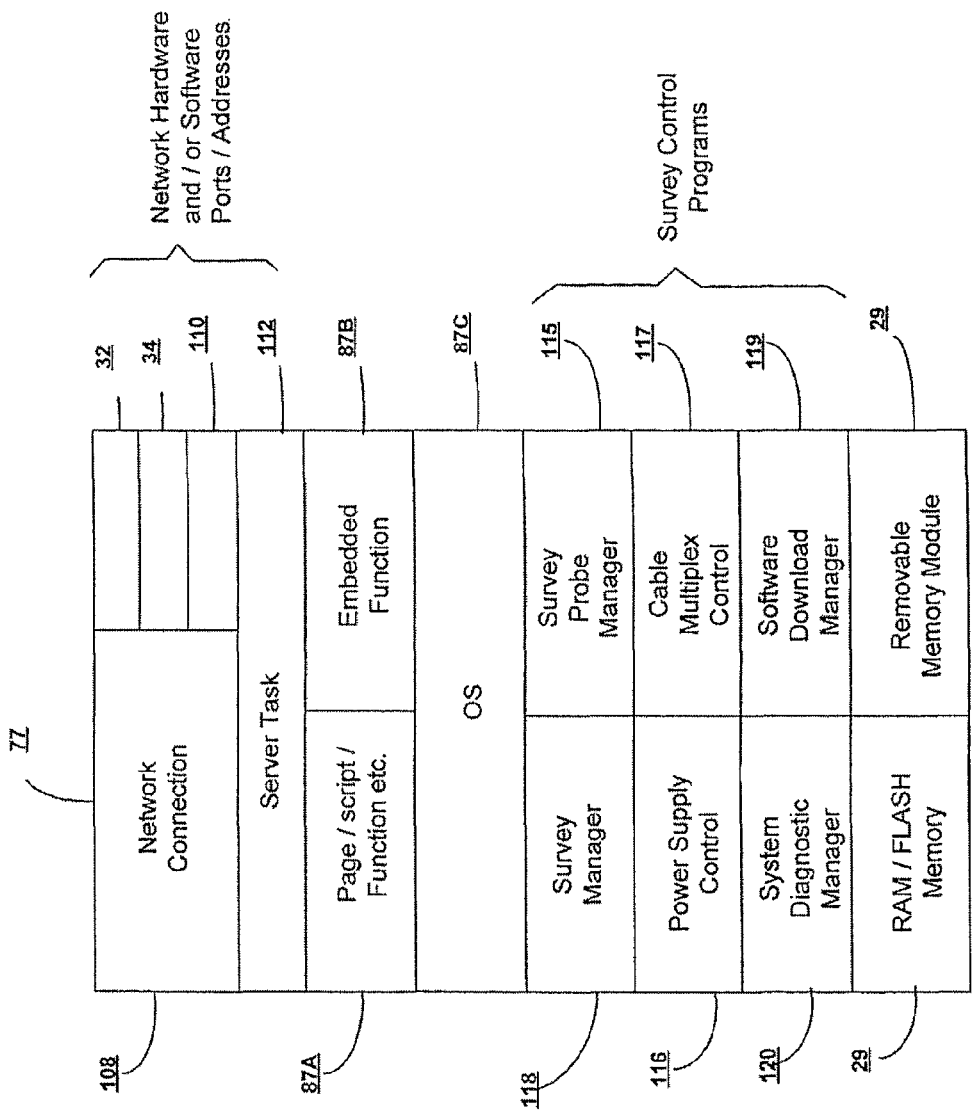
FIG. 12 is a schematic of a Survey Controller Program in accordance with embodiments of the present disclosure.

Turning now to FIG. 12, a typical survey controller program 77 (see, FIG. 3) for a survey controller 1 embedded microprocessor 21 is shown. The survey controller program includes a network connection 108 having multiple hardware and/or software ports or addresses, 32, 34, 110. The survey controller program has a controller and software tasks including survey manager 118, survey probe manager 115, power source control 116, cable multiplex control 117, system diagnostic manager 120, software download manager 119, associated with RAM/Hash memory cooperating to run under operating system 87C, server or server task 112 in cooperation with the network connection 108 which provides access to the survey controller 1 server from a local Client Terminal browser 5 (see, FIG. 1) or remote Client Terminal browser 7 (see, FIG. 1) on a local network or the internet. The local browsers 5 are typically able to access the server task 112 of the survey controller 1. Preferably, the browsers 7 may also access the server 112 of survey controller directly. A software task is defined very broadly to include both separate and integrated software embodiments which may or may not run concurrently with other software.

An embedded function 87B can be integrated with a page 87A. The page 87B may a basic HTML page, script, function or like program. The embedded function may be attached to a header of the page 87A or otherwise associated with the page wherein one of two events occurs when the page is accessed. First, the page 87A along with the embedded function 87B can be delivered to the browser that accessed the server and page. Alternatively, the embedded function 87A can be adapted to run on the server from which the page was accessed, even though the page is delivered to the appropriate browser. In the first case, the embedded function can be adapted to run at the browser. In the second case, the embedded function can run at the server that the browser accessed.

In one embodiments the embedded function is any executable content, such as Java applets. The executable content may be one or more small applications that conform to a restricted set of programming standards for running on browsers. When the embedded function is sent to the browser upon accessing a page, the function can be run at the browser to facilitate connection back to a specific server and server location. In another embodiment, the embedded function can run at the server and act to keep the existing connection open as well as to periodically send updated HTML pages. This latter technique places fewer demands on a browser's application capabilities but is less flexible. The remote browser or client may store data and determine how often to update or to request an update. The parameters relating to periodic updates may be stored locally at the remote browser, or may be downloaded to the survey controller. In the latter case the server task 112 may take the responsibility of periodically sending data to the remote browser without a request from the remote browser.

In one embodiment, a user at the browser 5 or 7 starts a browser application and connects to a homepage at a site's uniform resource locator (URL) address. An example process, where embedded functions are actually transferred to the browser from the accessed server, is outlined in FIG. 2. It will be understood that FIG. 2 serves to illustrate several other embodiments as well. In one such embodiment, communications are provided between the survey controller 1 at the survey site and a browser 5 or 7, preferably running on a client PC. For example, the browser may be located at a remote site on the Internet or other similar network in addition to being located at the survey site.

Initially, a user at the browser 5 or 7 can start a browser application and connect to a homepage at a site's uniform resource locator (URL) address (block 101). An HTTP server 1 having the URL address at die survey controller can deliver a home page for a site asset management system to the browser 7 (block 102). The user at browser 5 or 7 can select a defined link on the homepage to access and monitor a select function in the survey controller (block 103). In one example, the selected function can be the survey controller's completed survey result file (block 106). The server can generate a status page containing executable content, e.g. a Java Applet, aid deliver the page and the executable content to the client (block 105). For ease of understanding, this executable content can generally be referred to as the embedded function.

The client's browser 5 or 7, can load the page from the survey controller 1 and run the embedded function (executable content), which can immediately connect back to the selected service device, preferably using a separate address and protocol (block 105). The device will accept the connection initiated by the embedded function and begin delivering status data (in one embodiment, in real time) to the client browser 5 or 7.

In addition to monitoring selected information at various ports and addresses at the selected device server, the connection between the browser and the selected device may provide for any type of uploading or downloading of information, software, or control data to monitor, access, and otherwise reconfigure any portion of the survey site addressable and accessible through the server.

For example, the client browser 5 or 7 may download a new configuration or software upgrade for survey probes, survey controller, or any other programmable device or data source addressable and accessible through the server. Additionally, the browser may simply gather completed survey files or in-process survey data.

Figure 3:
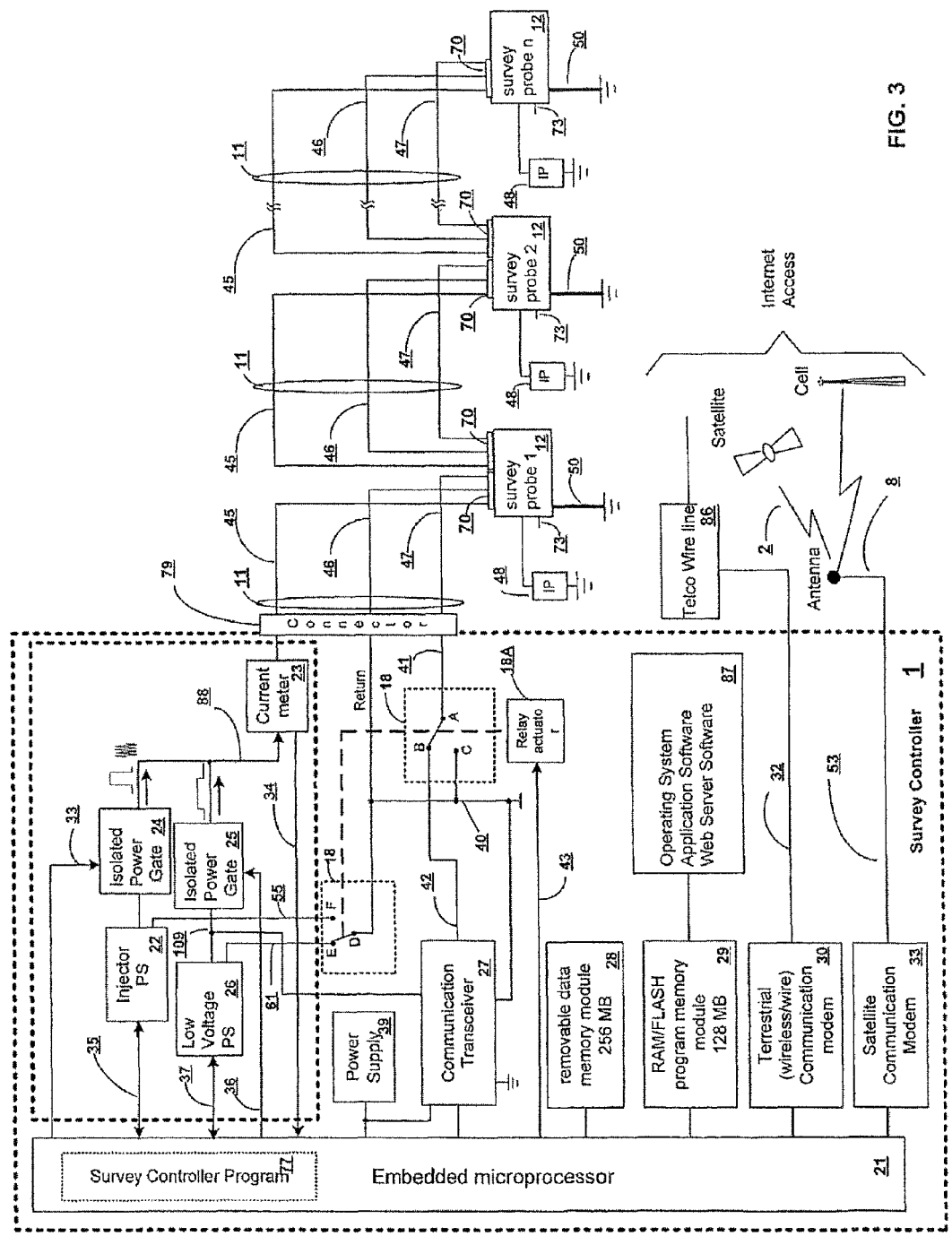
FIG. 3 is a block diagram of an example exploration survey system having an array of survey probes connected by cable to a survey controller according to embodiments of the present disclosure.

FIG. 3, another example embodiment, includes a survey controller 1 connected by cables 11 including, in a preferred embodiment, not more than 3 conductors, to an array of autonomous survey probes 12. In other embodiments, more or fewer than 3 conductors can be used, as will be recognised by those having ordinary skill in the art with the benefit of this disclosure.

In the example embodiment of FIG. 3, a survey event is created when an electrical current is forced through the earth between two or more survey probe 12 electrodes 50, and when two or more different survey probes 12 sense, digitize, and store the induced potentials detected by their respective electrodes 50. PS 22 and associated circuitry provide the electrical current. The timing and value of said electrical current is prescribed by Survey Control Program (SCP) 77. The survey event is completed when each different survey probes 12 report the digitized, potential measurements to Survey Controller 1, or when Survey Controller Program proscribes that survey probes store the measurements for later reporting.

Referring now to FIG. 9, the horizontal axis indicates the time sequence of voltage transitions on conductor 45. The transitions are fixed in sequence but vary in time as operably prescribed by CMC 117, and are labeled $T^0$, $T^1$, $T^2$ and $T^3$. State S0 begins with time $T^0$ and ends with $T^1$, state S1 begins at time $T^1$ and ends at time $T^2$, slats S2 begins at time $T^2$ and ends with time $T^3$, state S3 begins at $T^3$ and ends at time $T^0$. The vertical axis represents the magnitude of voltage measurable on cable conductor 45 relative to cable 46.

Now also referring to FIG. 3, during state S0, CMC 117 operates to de-activate relay coil 18A, connecting communication transceiver 27 to cable 11, conductor 47 through relay 18B contact pair B-A. SPP 78 of all survey probes 12, cooperatively de-activate relay coils 90, thereby connecting transceivers 54 to conductor 47 through relays 90A contacts A-B, providing a communication link between SPP 78 and SPM 115. SPM 115 and SPP 78 cooperatively operate to exchange messages, to setup for the next survey event, to report measurement data, and other messages necessary for coordination between survey controller 1 and survey probes 12.

At the beginning of state S1, PSC 116 operates to apply power to all survey probes 12 through conductors 45 and 46. Next, SPM 118 operates to initialize each participating survey probe 12 in preparation for collecting survey data from each "sensor" survey probe 12 and preparing for the next survey event.

PS 26 is a programmable power supply provided with conductor 61 for current return through relay 18DE, conductor 109 connecting to power gate 25 and to communication transceiver 27. Data bus 37 is provided for exchange of digital command and data between PSC 116 and PS 26. PS 26 is adaptable to receive commands from PSC 116, and operates to adjust output voltage to values prescribed by PSC 116 and to report actual output voltage values to PSC 116. Signal line 36 is provided for CMC 117 to signal Power Gate 25. CMC 117 is operable to signal Power Gate 25 to permit said current flow during state S1 and to block current flow during states S0, S2, and S3. Power Gate 25 is adaptable to respond to signals from control line 36 to block or permit current flow from PS 26 to meter 23. Data bus 34 is provided exchange of digital information between PSC 116 and programmable meter 23. Conductor 88 is provided to connect the output of Gate 24 and Gate 25 to meter 23. Meter 23 is adaptable to sensing, measuring, and digitizing the electrical current magnitude flowing from conductor 88 to conductor 45 and responsive to PSC 116 to report said digitised value to data bus 34 upon command by PSC 116. During S1, meter 23 signals PSC 116 that current flow has reached a prescribed value indicating that C1 energy storage devices are charged and that survey probes 12 are prepared to receive setup assignments for the next survey event to occur during the following state S3. SPM 118 then operates to send set-up command messages to each survey probe 12 prescribing each survey probe's function to be performed during the survey event.

For the purpose of better understanding the present invention, the following scenario is presented as a simplified example of the processes which take place during state S1. SPM 115 commands each survey probe 12 to perform specific functions for the duration of the survey event. The functions are current injection, current receiver, and ground voltage potential sensor. For example, survey probe 12 "A" is assigned to current injection function, survey probe 12 "B" is assigned current receiver function to receive injection current, completing the path to PS 22 through the earth during the survey event. Survey probes 12 "C", "D", "E", –"Z", are assigned ground voltage potential sensors to sense, digitize, and record voltage potentials appearing at their respective electrodes 50 or 48, and are hereafter known as sensors.

Using signal line 36, CMC 117 signals gate 25 to close. Closure of gate 25 is detected by circuit 38 which signals SPP 78 over conductor 52. SPP 78 detects that the system is in state 82. SPP 78 of each survey probe proceeds to perform their respective setup instructions received from CMC 117.

Paths through relay contacts are specified by the numerical relay actuator number following by the contact, pair completing a circuit. For example, 18BA refers to the contacts B and A of relay actuator 18.

SPP 78 operates relay actuator 18, to establish a return path from cable conductor 46 through 18DF, conductor 55, to PS 22 return 55. Operation of relay actuator 18 also establishes a connection from cable conductor 47, connector 79, 18AC, conductor 40, to reference ground.

To continue the example, survey probe 12 "A" is assigned injection function. The associated SPP 78 operates relay actuators 89, 91, 90, and 92 through port connections to microprocessor 69, establishing a current path from cable conductor 47, through relay contacts 89AC, 91AC, conductor 85, contacts 92AC, connector 74 to electrode 50. Survey probe 12, and SPP 78 become idle until state S3 is detected by circuit 38, signaling SPP 78 through conductor 52. "A" survey probe 12 is thereby prepared as current injector.

Survey probe 12, "B" is assigned current return function. The associated SPP 78 operates relays actuator 89, 90, 92 through port, connections to microprocessor 69. These relays establish a return current path from electrode 50, through connector 74, through relay contacts 92AC, conductor 85, relay contacts 91AB, 89FD, connector 70, cable conductor 46, connector 79, relay contacts 18DF, conductor 55, to PS 22 return 55. Survey probe 12, and SPP 78 become idle until state S3 is detected by circuit 38 and signaled to SPP 78 through conductor 52. "B" survey probe 12 is thereby prepared as current receiver.

Survey probes 12, "C", "D", "E"-"Z" are assigned "sensor" function. The associated SPP 78 operates relay 89, and 90 to establish a circuit from electrode 50, connector 74, contacts 92AB, conductor 80, through signal conditioner 64, to signal line 49 to input multiplexor 65 of microprocessor system 51. SPP 78 operates to provide common reference to multiplexor 65 from conductor 40, through contacts 18CA, conductor 41 connector 79, cable conductor 47, connector 70, through relay contact 90AC, to conductor 107. "Sensor survey probes" 12, SPP 78 becomes idle until state S3 is detected by circuit 38 and signaled to SPP 78 through conductor 52. "Sensor" survey probes 12 are thereby prepared as current receiver To begin the survey event, PSC 116 operates to program injector PS 22 to the prescribed voltage during state S2 and adjusts PS 22 voltage to limit current through meter 23 during the survey event to the prescribed value.

At the beginning of state S3, CMC 117 operates to open power gate 24 which applies the output of injection PS 22 to electrode 50 of "A" survey probe 12, producing a current flow from electrode 50 through the earth to "B" survey probe 12, producing potentials at the surface measured and digitized by "sensor" survey probes 12.

Circuits 38 at each survey probe 12 operate to detect the transition from state S2 to state S3, corresponding to $T^3$, synchronizing the ADCs of all "sensor" survey probes 12. All "sensor" survey probes' SPP 78 operate to produce the prescribed number of ADC samples of the arithmetical difference between reference signal 44 and electrode 50 sensor signals, performs the prescribed filtering processes, and other prescribed data processing of the sensed voltage potentials during state S3, and stores the results in RAM/FLASH memory 62.

CMC 117 operates to enter state S0 by closing power gate 24. Circuits 38 of each survey probe detect removal of injection voltage from cable conductor 45 and signal the change to state S0 to SPP 78s via conductor 52. All survey probes SPP 78 operate to de-activate all relay actuators 89, 90, 91, and 92 and enter state S1.

Figure 2:
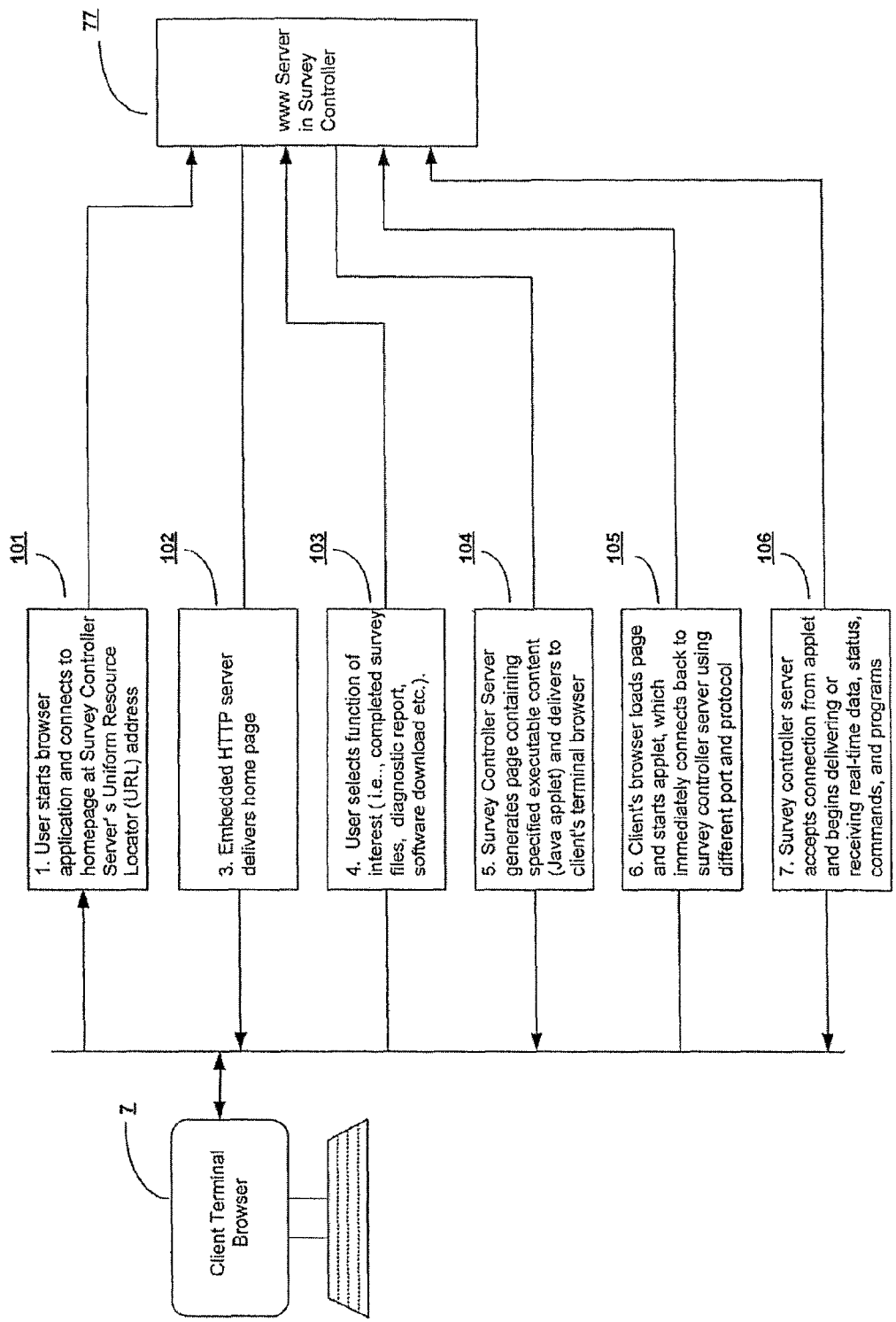
FIG. 2 is a drawing illustrating an example sequence for a client browser to establish a session with an embedded, web server survey controller according to embodiment of this disclosure.
Figure 4:
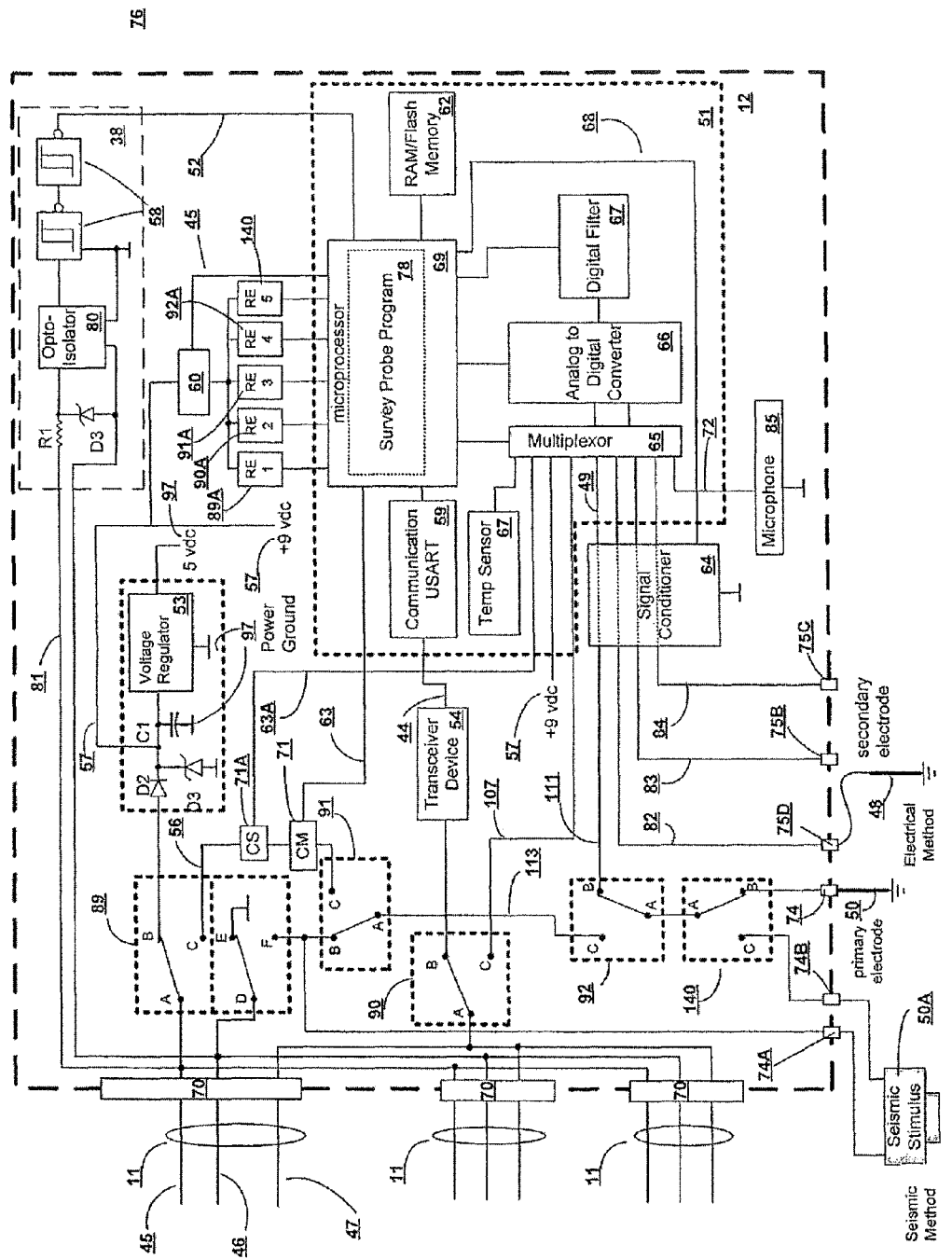
FIG. 4 is a block diagram of a survey probe according to embodiments of the present disclosure.

Referring to FIGS. 1, 2, 4, diagnostic testing and calibration of the multiplexor 65 and ADC 66 can be initiated by the a Client Terminal Browser by the investigator if accuracy of the data is questioned or programmatically by Survey Controller program 77 upon occurrence of a particular event detectable by SCP 77. In other embodiments, diagnostic testing can be initiated for any other reason. In one embodiment, SCP 77 issues a command SPP 69 to execute a certain calibration and functional test of the multiplexor 65 and ADC 66. In one embodiment, ADC 66 operates to apply a precision internally sourced test voltage internally through multiplexor 65, internal buffer amplifier, and to ADC 66. A measurement of the precision voltage is taken and compared to the known, expected value. SPP 78 adjusts gain aid offset values of the internal buffer amplifier to achieve the expected value. Survey Probe Program 78 calibrates ADC 66. The Survey Controller may operate to send a command to SPP 78 to execute a measurement of, for instance, a 9 volt un-regulated voltage by commanding the multiplexor 65 to apply the voltage on conductor 57 to the ADC 66 and instruct ADC 66 to measure, digitize, and store the value in memory. If the voltage is found to be less than the stipulated value at the time specified, an abnormal event can be recorded and transmitted to the SCF 77, which places the measurement in an abnormal event file in RAM/Flash memory 29 for analysis by a remote operator. An authorized operator may access Survey Controller Program's 77's webpage and through the processes identified in FIG. 2, access the abnormal event File. Other diagnostic tests appropriate for the particular embodiment are similarly implemented.

Referring to FIGS. 3 and 4, electronic switching device, 71 is connected through relay contact 89CA operable to modulate the electrical current passing through the circuit comprising PS 22, Gate 24, conductor 88, current meter 23, connector 79, to cable conductor 45 through relay contact 89AC, to conductor 56, to input to switching device 71, output from switching device 71, through relay contacts 91CA, conductor 85 through relay contacts 92CA, to connector 74, to one electromechanical, magnetic, or electrical stimulus injectors to receive electrical stimulation from connector 74, in response to signals applied to conductor 63 by SPP 78.

For electrical stimulus injectors, such as used in the electrical resistivity method embodiment of the present invention, the stimulus is an electrical current passing from the current injection survey probe 12, metal stake S0, through the earth, to the receiver metal stake 50 of receive survey probe 12, through relay contacts 92AC, conductor 85, through relay contacts 91AB, through relay contacts 89FD, through connector 70, cable conductor 46, through conductor 40, through relay contacts 18DF, to conductor 55, to injector PS 22 return.

For electromechanical, magnetic, radio frequency, or other electrical stimulus injector embodiments of the present invention, the stimulus apparatus receives power through PS22, power gate 24, conductor 88, CM 23, connector 79, conductor 45, connector 70, relay contacts 89 AC, current sensor 71A, current modulator 71, relay contacts 91CA, conductor 113, relay contacts 92CA, connector 74 and 74A, with return path through relay contacts 89FD, connector 70, to cable conductor 46, though connector 79, through relay contacts 18DF, through conductor 55, and to PS 22 return.

Electrical, vibration, seismic, magnetic, and other sensors connect to signal conditioner 64, through differential connectors 75B and 75C, conductors 83 and 84, through signal conditioner 64, to multiplexor 65 adaptable to apply the difference signal to analog to digital converter 66. SPP 78 operates to perform digital signal processing and filtering of the digitized data operates to store said data into RAM/Flash Memory, accessible to survey controller Survey probe Manager (SPM) 29 on command. Microphone 85 connects through conductor 72 to multiplexor 65. Also referring to FIG. 8, Microphone 85 is coupled to the survey probe housing 49 coupled to conductive stake 50, adapted to produce electrical signals corresponding to sensed vibrations conducted from the ground 76, through conductive stake 59. Said signals are applied to multiplexor 65 through conductor 72. SPP 78 is operative to apply said signals through multiplexor 65 to ADC 66 for digitizing and filtering, and storing the digitized signals in RAM/Flash memory 62 available for access by SCP 77.

Referring to FIGS. 3, 4 and 5, a linear survey measurement cable array 11a is assembled on site by connecting a first cable 11 from survey controller 1 to a first survey probe 12, a second cable 11, from the first survey probe to a second survey probe, and a next cable 11 from the second survey probe to a next survey probe, until all the survey probes have been connected as shown in array 19. Connection of a survey probe 12 onto the chain, operates to charge energy storage device C1 of said survey probe. Power from C1 is supplied to operate said survey probe electronics 12. SPP 78 operates to initialise all electronics to state S1 aid to send a data message to SCP 77 to announce its addition to the cable array. Said data message contains the serial number assigned during manufacture. SCP 77 responds to said data message with a command message containing a new address field. SPP 78, receives said command message, extract said new address field and stores it in memory 62. SPP 77 will generally operate to send future command messages to said survey probe addressing it by the new address.

A second embodiment of the present invention operates to acquire the survey probe serial number and operates to address future commands to said survey probe addressing it by said serial number. SPM 115 operates to maintain survey probe serial numbers, together with the order in which said serial number is reported, in RAM/FLASH memory 62. Said reporting order is the ordinate location on the array cable.

Referring FIG. 4, Temp Sensor 67 is adapted to sense the internal temperature of embedded computer 51 and produce a signal corresponding to the temperature. Periodically or on command by SCP 77, SPP 78 operates to measure the temperature and with an internally generated precise reference voltage, perform a calibration process and make compensations and adjustments to said components to assure accurate operation of the multiplexor, internal buffers, amplifiers, and other internal circuits during survey events. SPP 78 operates to measure +9 vdc 57 voltage level of energy source C1 at prescribed times and calculates the operating time remaining before SPP 78 places embedded system 51 in idle mode to reduce power consumption.

Figure 8:
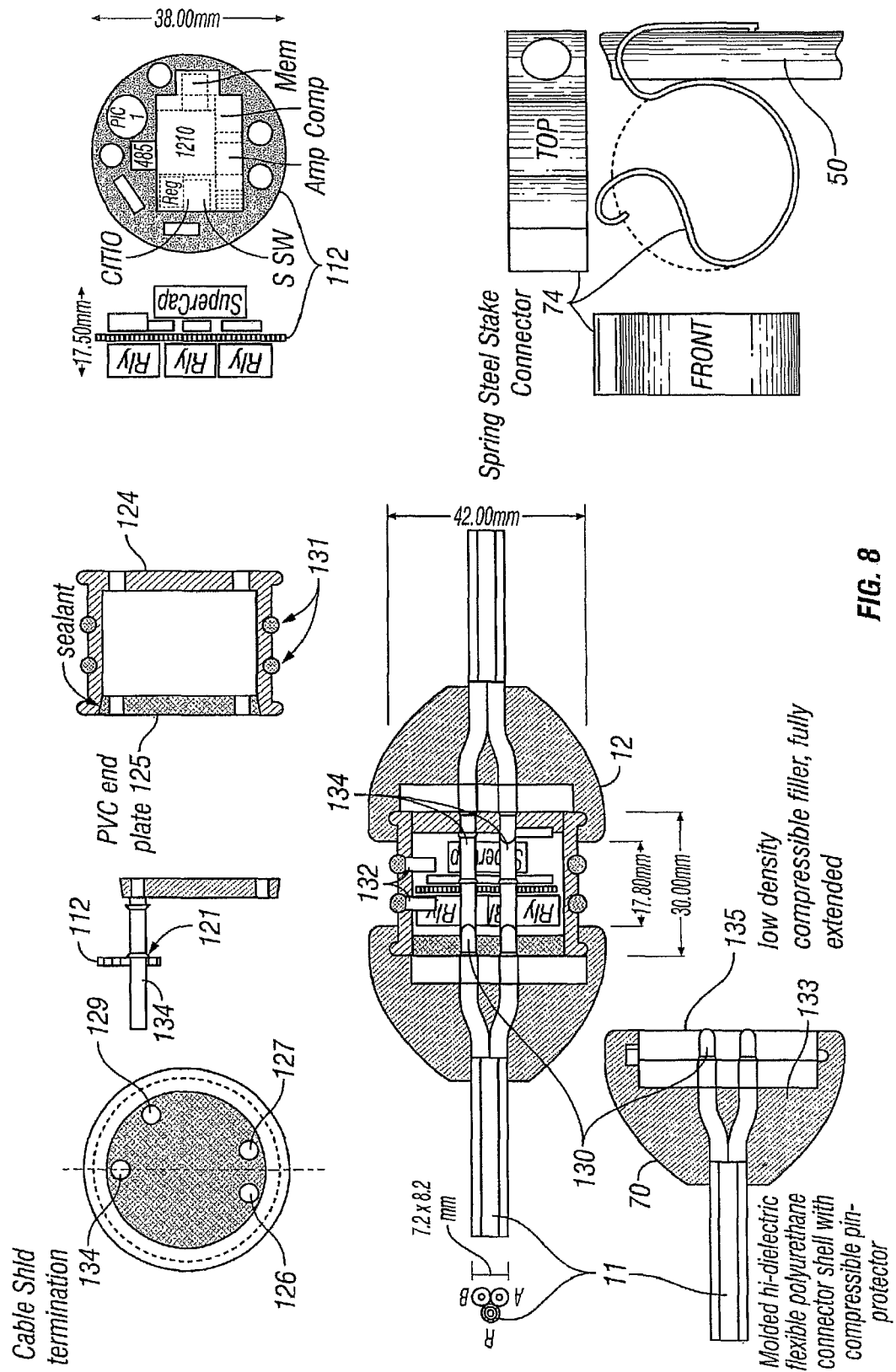
FIG. 8 is a view of an embodiment of a survey probe with cables and connectors according to embodiments of the present disclosure attached to a conductive stake in the ground.

Referring to FIG. 8, conductive stake 50 is inserted into the earth operating to make electrical contact with the earth and to mount spring steel stake connector 74. Spring steel stake connector 74 fastens to conductive stake 50 and operates to mount survey probe 12 onto stake 50 and provide electrical contact between contact rings 131 and conductive stake 50. Survey probe 12 comprises housing 124, assembled printed circuit board 112, PVC end plate 125 operating to seal the PCB assembly 112 from ingress of water and other chemicals and vapors. Female connector tubes 134 penetrate PVC end plate 125 and PVC housing 124 and are sealed at holes of ingress 127, 126, 128, and 129 of housing 124 and at corresponding holes through end plate 125. Connector tubes 134 are soldered to PCB 112 solder pads and solder rings 121 which operate to conduct signals and power to PCB 112. Contact pins 132 operate to make electrical contact between contact rings 131 and Relay 92 contact A of FIG. 4. Connector 70 comprises molded connector shell 133, spring loaded bayonet type connector pins 130 electrically attached to conductors of cable segment 11, and low density compressible filler 135. Connectors 70 operate to make electrical contact between conductors of cable 11 and corresponding female connector tubes 134 when joined to survey probe housing 124. Low density compressible filler 135 operates to protect connectors pins 130 when not mated to housing 124.

REFERENCES

Each of the following is incorporated by reference in its entirety.
U.S. Pat. No. 6,404,203
U.S. Pat. No. 3,810,000
U.S. Pat. No. 4,835,474
U.S. Pat. No. 4,942,361
U.S. Pat. No. 5,144,253
H. Robert Burger, "Exploration Geophysics of the Shallow Subsurface" pp. 241-361, Prentice Hall 992.
"Precision Analog to Digital Converter (ADC) with 8051 Microcomputer and Flash Memory," Texas Instruments 2002.

What is claimed is:

1. A system for introducing electrical currents into a surface as stimulus for geophysical measurements, the system comprising:
 a plurality of survey probes for electrode contact with the surface at respective points thereof, wherein respective ones of the survey probes are configurable as current injection-type and current receiver-type survey probes for introduction of the electrical current stimulus into the surface;
 a current injection power supply coupled to supply the electrical current to, and to receive return current from, respective ones of the survey probes;
 a controller is configured to individually and selectively program plural of the current injection-type survey probes to inject current into the surface and to individually and selectively program plural of the current receiver-type survey probes to provide respective return paths for current injected into the surface; and
 cable segments suitable for electrically connecting the controller to a first one of the survey probes and for electrically interconnecting each successive downstream neighbor survey probe to a next successive downstream neighbor survey probe,
 wherein the controller is configured to execute a startup sequence that polls the survey probes using signals conveyed via the cable segments to determine a relative interconnected order of the survey probes.

2. The system of claim 1,
 wherein the individual and selective programming provides simultaneous current injection at multiple sources through selected ones of the injection-type survey probes.

3. The system of claim 1,
 wherein the individual and selective programming provides current injection through selected ones of the injection-type survey probes according to a timing scheme.

4. The system of claim 1,
 wherein the individual and selective programming provides simultaneous current return paths through selected ones of the current receiver-type survey probes.

5. The system of claim 1,
 wherein the individual and selective programming provides current return paths through selected ones of the current receiver-type survey probes according to a timing scheme.

6. The system of claim 1,
 wherein the current injection power supply is integrated with the controller.

7. The system of claim 1,
 wherein a particular one of the survey probes is selectively programmable by the controller to act as injection-type survey probes or current receiver-type survey probes.

8. The system of claim 7,
 wherein the particular survey probe is further selectively programmable by the controller to act as electrical potential sensor-type survey probes.

9. The system of claim 8,
 wherein the particular sensor-type survey probe is configured to temporarily isolate itself from an external power supply connection, and to instead operate from an internal power source, for a period during which the respective survey probe acquires geophysical measurement data.

10. The system of claim 1,
 each of plural sensor-type survey probes is configured to temporarily isolate itself from an external power supply connection, and to instead operate from an internal power source, for a period during which the respective survey probe acquires the geophysical measurements.

11. A system for introducing electrical currents into a surface as stimulus for geophysical measurements, the system comprising:
 a plurality of survey probes for electrode contact with the surface at respective points thereof, wherein respective ones of the survey probes are configurable as current injection-type and current receiver-type survey probes for introduction of the electrical current stimulus into the surface;
 a current injection power supply coupled to supply the electrical current to, and to receive return current from, respective ones of the survey probes;
 a controller is configured to individually and selectively program plural of the current injection-type survey probes to inject current into the surface and to individually and selectively program plural of the current receiver-type survey probes to provide respective return paths for current injected into, the surface; and
 cable segments suitable for electrically connecting the controller to a first one of the survey probes and for electrically interconnecting each successive downstream neighbor survey probe to a next successive downstream neighbor survey probe, wherein the controller is further configured to execute a startup sequence that polls the survey probes using signals conveyed via the cable segments to determine a relative interconnected order of the survey probes, wherein each survey probe is configured to (i) disconnect its respective downstream neighbor survey probe and enter an idle state, (ii) if in the idle state, report its identifier to the controller in response to a polling command; and (iii) change to a state other than the idle state after reporting its respective identifier.

12. A system for introducing electrical currents into a surface as stimulus for geophysical measurements, the system comprising:
a plurality of survey probes for electrode contact with the surface at respective points thereof, wherein respective ones of the survey probes are configurable as current injection-type and current receiver-type survey probes for introduction of the electrical current stimulus into the surface;
a current injection power supply coupled to supply the electrical current to, and to receive return current from, respective ones of the survey probes;
a controller is configured to individually and selectively program plural of the current injection-type survey probes to inject current into the surface and to individually and selectively program plural of the current receiver-type survey probes to provide respective return paths for current injected into the surface; and
cable segments suitable for electrically connecting the controller to a first one of the survey probes and for electrically interconnecting each successive downstream neighbor survey probe to a next successive downstream neighbor survey probe,
wherein the controller is further configured to execute a startup sequence that polls the survey probes using signals conveyed via the cable segments to determine a relative interconnected order of the survey probes, wherein each survey probe is configured to (i) disconnect its respective downstream neighbor survey probe and enter an idle state, (ii) if in the idle state, report its identifier to the controller in response to a polling command; and (iii) change to a state other than the idle state after reporting its respective identifier; and
wherein, for an actual deployment of the survey probes at respective positions along the surface and with respective of the interconnecting cable segments coupled therebetween, the individual and selective programming is in accordance with a desired spatial and temporal scheme for current injection based on the respective identifiers, and orderings, thereof reported as part of the startup sequence.

13. A method comprising:
placing a plurality of survey probes for electrode contact with a surface at respective points thereof, wherein respective ones of the survey probes are configurable as current injection-type and current receiver-type survey probes for introduction of an electrical current stimulus into the surface;
coupling a current injection power supply to respective ones of the survey probes, wherein the current injection power supply is configured to supply the electrical current to, and to receive return current from the respective ones of the survey probes;
programming, individually and selectively, plural of the current injection-type survey probes to inject current into the surface;
programming, individually and selectively, plural of the current receiver-type survey probes to provide respective return paths for current injected into the surface;
via a plurality of respective cable segments, electrically connecting a controller to a first one of the survey probes and each successive downstream neighbor survey probe to a next successive downstream neighbor survey probe; and
executing a startup sequence that polls the survey probes using signals conveyed via the plurality of cable segments to determine a relative interconnected order of the survey probes.

14. The method of claim 13,
wherein the programming plural of the current injection-type survey probes provides simultaneous current injection at multiple sources through selected ones of the injection-type survey probes.

15. The method of claim 13,
wherein the programming plural of the current injection-type survey probes provides current injection through selected ones of the injection-type survey probes according to a timing scheme.

16. The method of claim 13,
wherein the programming plural of the current receiver-type survey probes provides simultaneous current return paths through selected ones of the current receiver-type survey probes.

17. The method of claim 13,
wherein the programming plural of the current receiver-type survey probes provides current return paths through selected ones of the current receiver-type survey probes according to a timing scheme.

18. The method of claim 13,
wherein the current injection power supply is integrated with the controller.

19. The method of claim 13 further comprising,
selectively programming a particular one of the survey probes to act as either an injection-type survey probe or a current receiver-type survey probe.

20. The method of claim 19 further comprising,
selectively programming the particular one of the survey probes to act as an electrical potential sensor-type survey probe.

* * * * *